(12) United States Patent
Konagaya et al.

(10) Patent No.: US 9,022,710 B2
(45) Date of Patent: May 5, 2015

(54) ANTI-SEIZING NUT

(71) Applicant: Aoyama Seisakusho Co., Ltd., Niwa-Gun (JP)

(72) Inventors: Satoshi Konagaya, Niwa-Gun (JP); Kenya Yamada, Niwa-Gun (JP); Sadayoshi Hasegawa, Niwa-Gun (JP); Satoshi Iida, Niwa-Gun (JP)

(73) Assignee: Aoyama Seisakusho Co., Ltd., Niwa-Gun (JP)

( * ) Notice: Subject to any disclaimer, the term of this patent is extended or adjusted under 35 U.S.C. 154(b) by 0 days.

(21) Appl. No.: 14/169,428

(22) Filed: Jan. 31, 2014

(65) Prior Publication Data
US 2014/0147230 A1 May 29, 2014

Related U.S. Application Data

(63) Continuation of application No. PCT/JP2011/069715, filed on Aug. 31, 2011.

(51) Int. Cl.
*F16B 33/02* (2006.01)
*F16B 35/04* (2006.01)

(52) U.S. Cl.
CPC ............... *F16B 33/02* (2013.01); *F16B 35/047* (2013.01)

(58) Field of Classification Search
CPC ............................... F16B 35/047; F16B 33/02
USPC ................................................ 411/436, 366.1
See application file for complete search history.

(56) References Cited

U.S. PATENT DOCUMENTS

| | | | | |
|---|---|---|---|---|
| 1,210,508 A | * | 1/1917 | Marye | 411/276 |
| 1,447,056 A | * | 2/1923 | Bates | 411/307 |
| 2,255,384 A | * | 9/1941 | Hood | 411/277 |
| 3,566,947 A | * | 3/1971 | Jukes | 411/260 |
| 4,262,941 A | * | 4/1981 | Lalikos et al. | 285/110 |
| 4,293,262 A | * | 10/1981 | Holmes | 411/311 |
| RE31,284 E | * | 6/1983 | Holmes | 411/311 |
| 4,389,145 A | * | 6/1983 | Capuano | 408/1 R |
| 4,750,851 A | * | 6/1988 | Thomey | 411/360 |
| 4,826,377 A | * | 5/1989 | Holmes | 411/311 |
| 4,842,466 A | * | 6/1989 | Wheeler et al. | 411/366.3 |
| 5,014,411 A | * | 5/1991 | Bonstein | 29/525.11 |
| 5,342,096 A | * | 8/1994 | Bachle et al. | 411/533 |
| 5,609,455 A | * | 3/1997 | McKewan | 411/386 |
| 5,836,731 A | * | 11/1998 | Goodwin et al. | 411/386 |

(Continued)

FOREIGN PATENT DOCUMENTS

| JP | 05-057415 U | 7/1993 |
|---|---|---|
| JP | 10-141343 A1 | 5/1998 |

(Continued)

*Primary Examiner* — Gay Ann Spahn
(74) *Attorney, Agent, or Firm* — Burr & Brown, PLLC

(57) ABSTRACT

Provided is a nut into which a bolt (10) including a male-threaded portion with a male-threaded external diameter d and a male-threaded core diameter d1 is screwed, wherein a bolt insertion side end of a female-threaded portion (21) formed in a nut body (20) is provided with an incompletely threaded female portion (22) that is formed by one to three pitches so that an internal diameter dimension D is larger than (d+d1)/2 and is smaller than the male-threaded external diameter d. Accordingly, even when the bolt is screwed into the nut in the inclination direction, the bolt may be rotated about a contact surface with respect to the incompletely threaded female portion (22), and hence seizing may be prevented.

3 Claims, 4 Drawing Sheets

(56) References Cited

U.S. PATENT DOCUMENTS

| | | | |
|---|---|---|---|
| 5,865,581 A * | 2/1999 | Sadri et al. | 411/5 |
| 6,120,227 A | 9/2000 | Murase et al. | |
| 6,149,363 A * | 11/2000 | March | 411/366.1 |
| 6,334,747 B1 | 1/2002 | Torisu et al. | |
| 6,561,741 B2 * | 5/2003 | Garver | 411/386 |
| 7,547,049 B2 * | 6/2009 | Gashgaee | 285/384 |
| 8,348,577 B2 * | 1/2013 | Ferslew et al. | 411/427 |
| 8,632,288 B2 * | 1/2014 | Konagaya et al. | 411/386 |
| 8,696,281 B2 * | 4/2014 | Tomm | 411/308 |
| 2002/0057954 A1 * | 5/2002 | Kato | 411/386 |
| 2002/0076302 A1 * | 6/2002 | Garver | 411/386 |
| 2003/0059275 A1 * | 3/2003 | Mizuno et al. | 411/386 |
| 2004/0009052 A1 * | 1/2004 | Jungman et al. | 411/368 |
| 2006/0245842 A1 * | 11/2006 | Raub et al. | 411/378 |
| 2008/0038083 A1 * | 2/2008 | Student et al. | 411/378 |
| 2009/0060676 A1 | 3/2009 | Murase et al. | |
| 2013/0147189 A1 * | 6/2013 | Horsfall et al. | 285/353 |

FOREIGN PATENT DOCUMENTS

| | | |
|---|---|---|
| JP | 10-274227 A1 | 10/1998 |
| JP | 2000-018226 A1 | 1/2000 |
| JP | 2001-090721 A1 | 4/2001 |
| JP | 3336257 B2 | 10/2002 |
| WO | 2006/134626 A1 | 12/2006 |

* cited by examiner

ANTI-SEIZING NUT

BACKGROUND OF THE INVENTION

1. Field of the Invention

The present invention relates to an anti-seizing nut in which seizing scarcely occurs even when a bolt is screwed in an inclination direction.

2. Description of Related Art

In a case where a bolt is screwed into a nut, it is desirable to insert the bolt so that the axis of the bolt accurately matches the axis of the screw of the nut. However, in an actual automobile assembly line or the like, the bolt may be inserted into the nut while the axis is slightly inclined by the use of a tool such as a powered driver in some cases. In this case, a thread ridge of the bolt is fitted to a groove deviated by one pitch from the fitting target groove of the screw of the nut. In this state, when the bolt is forcedly threaded into the nut, seizing occurs, and hence a severe trouble may occur in which the bolt is not easily separated from the nut.

Therefore, various bolts have been proposed which prevent the seizing even when the bolt is obliquely inserted into the nut. As a representative example, according to Patent Document 1 of the present applicant, a front end of a nominal female-threaded portion is provided with a pilot portion (called a bar tip portion or a guide portion), and an outer periphery of a front end of the pilot portion contacts the screw when a bolt is inserted in the inclination direction, thereby correcting the posture of the bolt. Further, as illustrated in Patent Document 2 and Patent Document 3, an anti-seizing bolt is also proposed which improves a posture correction effect by forming various thread ridges in a pilot portion.

Incidentally, since the diameter of the pilot portion is, of course, smaller than that of the nominal female-threaded portion of the bolt, a small-diameter female-threaded portion is inevitably formed between the nominal female-threaded portion and the pilot portion, and hence seizing occurs in the small-diameter female-threaded portion. Further, even when the pilot portion is formed in a long size, no particular seizing preventing effect is exhibited just by decreasing the inclination of the bolt. Moreover, the pilot portion becomes a useless portion that does not contribute to the improvement in fastening force in the fastened state. For this reason, it is not an advantageous countermeasure to form the long pilot portion even from the viewpoint of costs and resources.

Furthermore, Patent Document 4 discloses a technique of preventing seizing by cutting out the thread ridge end portions of the nut and the bolt so as to remove an incomplete female-threaded portion. However, in this technique, both the bolt and the nut are formed in a particular shape, and hence only one of them may not be used solely. In this way, the related art on the nut that prevents the seizing even when the bolt having a general shape is obliquely inserted into the nut substantially does not exist.

Patent Document 1: JP 10-141343 A
Patent Document 2: JP 3336257 B2
Patent Document 3: WO 2006/134626
Patent Document 4: JP 10-274227 A

SUMMARY OF THE INVENTION

Therefore, the present invention is made to solve the above-described problems, and an object thereof is to provide an anti-seizing nut capable of reliably preventing seizing even when a bolt having a general shape is obliquely inserted into the nut.

In order to solve the above-described problems, the present invention provides an anti-seizing nut into which a bolt including a male-threaded portion with a male-threaded external diameter d and a male-threaded core diameter $d_1$ is screwed, wherein a bolt insertion side end of a female-threaded portion formed in a nut body is provided with an incompletely threaded female portion that is formed by one pitch or more so that an internal diameter dimension D is larger than $(d+d_1)/2$ and is smaller than the male-threaded external diameter d.

According to the more desirable embodiment, the incompletely threaded female portion is formed in the nut body by one to four pitches.

The nut of the present invention is provided with the incompletely threaded female portion that is formed at the bolt insertion side end of the female-threaded portion so that the internal diameter dimension D is larger than $(d+d_1)/2$ and is smaller than the male-threaded external diameter d. For this reason, even when the bolt is inserted into the nut of the present invention in a slightly inclination direction, the thread ridge of the incompletely threaded female portion of the nut does not forcedly engage with the thread ridge of the bolt, and hence the seizing does not occur. This point will be described later in detail. Moreover, since the incompletely threaded female portion is formed by one pitch or more, the bolt is not seized even when the bolt is inserted in any direction. Further, the nut of the present invention is used in combination with the general bolt, but it is needless to mention that the bolt may be a bolt of which a front end is provided with a pilot portion.

DETAILED DESCRIPTION OF THE INVENTION

Hereinafter, the present invention will be described in more detail along with the embodiment thereof.

Figure 1:
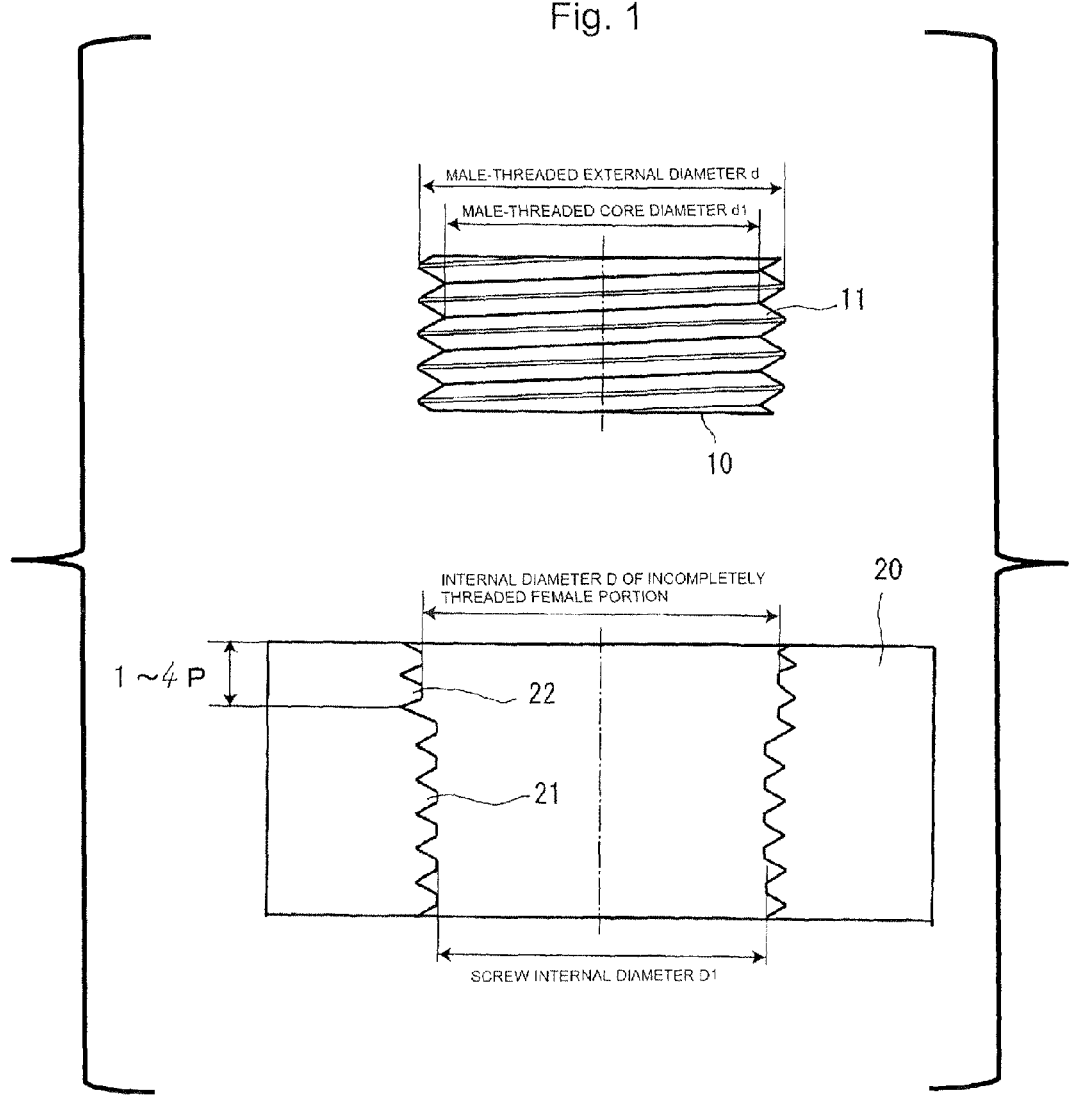
FIG. 1 is an explanatory diagram of a main part of the present invention.

FIG. 1 is an explanatory diagram of a main part of the present invention, where Reference Numeral 10 indicates a bolt and Reference Numeral 20 indicates a nut body provided with a female-threaded portion 21 into which the bolt 10 is screwed. In FIG. 1, the bolt 10 is depicted so that only a front end portion of a male-threaded portion 11 is illustrated, but is a bolt that includes a head portion and a shaft portion as in the related art. The male-threaded portion 11 of the bolt 10 has a standard thread shape, the male-threaded external diameter is denoted by d, and the male-threaded core diameter is denoted by $d_1$.

The internal diameter of the nominal female-threaded portion 21 formed in the nut body 20 is denoted by $D_1$. As defined in JIS-B0205, the nominal diameter of the bolt 10 is equal to the male-threaded external diameter d, and the internal diameter $D_1$ of the female-threaded portion 21 is equal to the male-threaded core diameter $d_1$. That is, a relation is established in which the nominal diameter of the bolt, the nominal diameter of the nut, the male-threaded external diameter d of the bolt, the internal diameter $D_1$ of the female-threaded portion 21, and the male-threaded core diameter $d_1$ are equal to one another. The above-described relation is generally established, and is not unique in the present invention.

As illustrated in FIG. 1, the present invention is characterized in that an incompletely threaded female portion 22 is formed in the bolt insertion side end of the nut body 20. The incompletely threaded female portion 22 is formed so that the internal diameter dimension D is larger than (d+d1)/2 and is smaller than d, and is formed by one pitch or more from the end surface of the nut body 20. Next, the reason why the internal diameter dimension D of the incompletely threaded female portion 22 is set in this way and the operation and effect thereof will be described.

Figure 2:
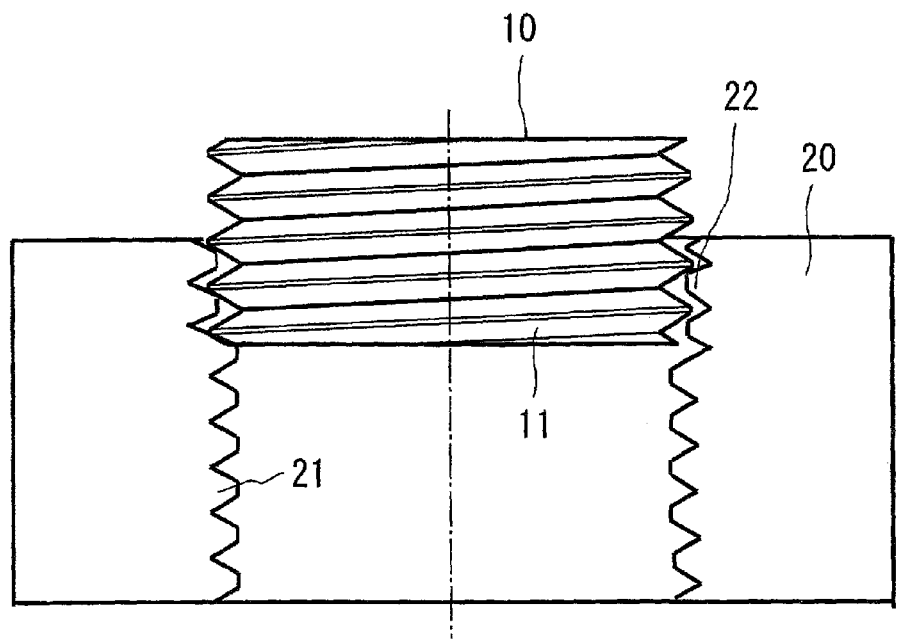
FIG. 2 is a diagram illustrating a state where a bolt of the present invention is correctly inserted into a screw.

FIG. 2 is a diagram illustrating a state where the bolt 10 is correctly inserted into the nut of the present invention. The thread ridge of the incompletely threaded female portion 22 of the nut contacts the thread ridge of the bolt 10. Since the internal diameter dimension D of the incompletely threaded female portion 22 of the nut is smaller than the male-threaded external diameter d of the bolt, the male-threaded portion 11 of the bolt 10 may be normally threaded into the nut in the case of FIG. 2. In this state, when the bolt 10 is rotated, the fastening operation is completed.

Figure 3:
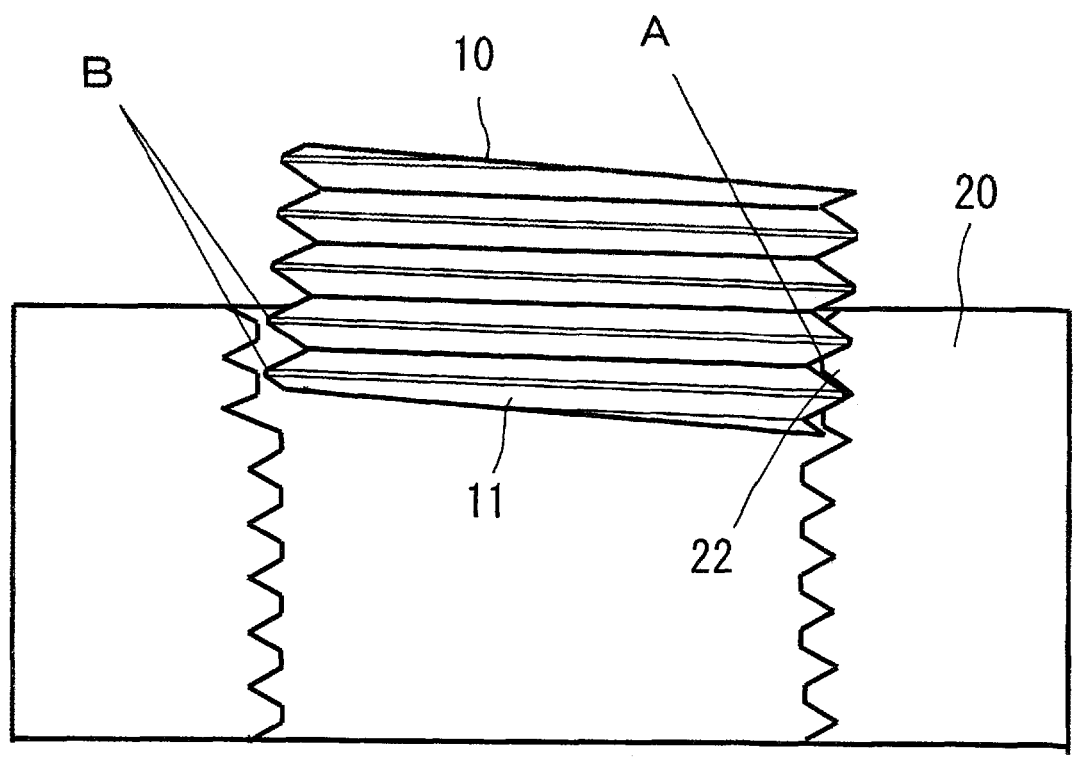
FIG. 3 is a diagram illustrating a state where the bolt of the present invention is obliquely inserted into the screw.

FIG. 3 is a diagram illustrating a state where the bolt 10 is obliquely inserted into the nut of the present invention. In this way, when the one-side thread ridge of the incompletely threaded female portion 22 of the nut deeply engages with the groove of the thread ridge of the bolt 10 at the point A, the point B (the thread ridge top portion) on the bolt on the opposite side to the point A by 180° does not engage with the opposite thread ridge of the incompletely threaded female portion 22. The reason will be described by FIGS. 4A and 4B.

Figure 4:
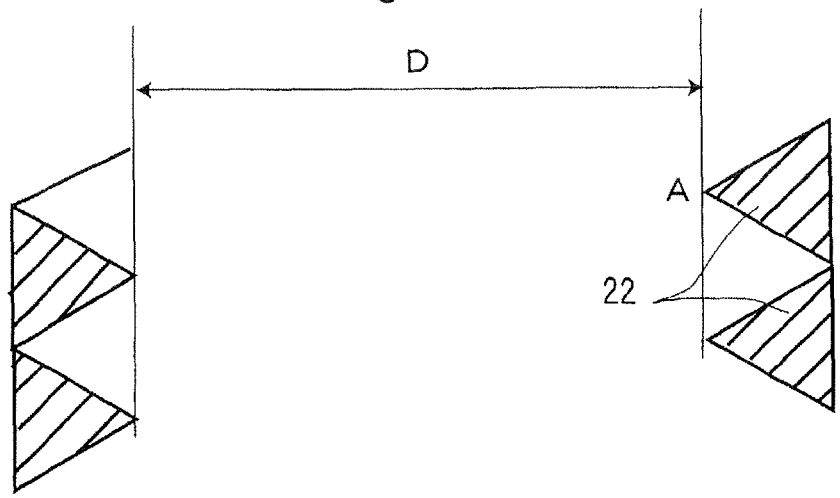
FIG. 4 is an explanatory diagram of a dimensional relation.
Figure 4:
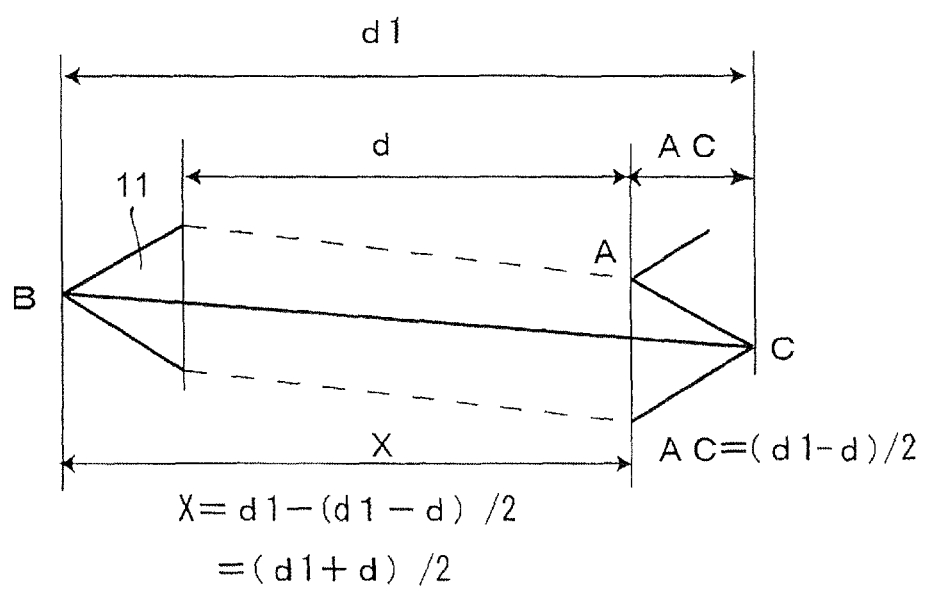

As illustrated in FIG. 4B, when the distance (which is the distance projected onto the plane perpendicular to the axis of the nut and is the same in the description below) from the point A of the male-threaded portion 11 of the bolt 10 to the point B is set to X, an equation of X=d1−AC is obtained. Since the distance AC between the point A and the thread ridge top portion C is (d1−d)/2, an equation of X=d1−AC=d1−(d1−d)/2=(d1+d)/2 is obtained. Meanwhile, as illustrated in FIG. 4A, the distance from the point A to the thread ridge of the incompletely threaded female portion 22 at the opposite position of 180° is D, and in the present invention, D is set to be larger than (d1+d)/2. For this reason, X is inevitably smaller than D, and hence in the state of FIG. 3, the point B on the bolt opposite to the point A by 180° does not interfere with the incompletely threaded female portion 22 of the nut.

Accordingly, since the bolt 10 may freely change the inclination angle of the axis with respect to the point A, the bolt 10 may freely tilt back to the state of FIG. 2 from the state of FIG. 3. Even in the state of FIG. 3, the thread ridge of the bolt 10 just engages with the incompletely threaded female portion 22 of the nut at the point A, and the thread ridge does not cause any interference at the other positions, so that seizing does not occur.

In this way, when the bolt may freely tilt back about the point A as the initial engagement position, the counter-clockwise rotation moment on FIG. 3 generated by the force applied from the driver to the bolt 10 returns the bolt 10 to the correct posture as illustrated in FIG. 2. Then, when the bolt 10 is further rotated, the male-threaded portion 11 of the bolt 10 correctly engages with the female-threaded portion 21 of the nut body 20, and hence the fastening operation is completed.

As described above, when the internal diameter dimension D of the incompletely threaded female portion 22 of the nut is set to be smaller than the male-threaded external diameter d of the bolt, it is possible to eliminate the possibility that the male-threaded portion 11 of the bolt 10 does not contact the incompletely threaded female portion 22 at all. When the dimension is set according to the present invention, the male-threaded portion 11 of the bolt 10 essentially contacts any one point of the incompletely threaded female portion 22 of the nut, and hence the bolt may tilt back about the point.

Further, when the incompletely threaded female portion 22 is provided by at least one pitch or more, the above-described effect may be obtained even when the bolt 10 is inclined in any direction. However, since there is a possibility that the opposite side is not the incompletely threaded female portion 22 according to the contact position in the case of one pitch in the actual case, it is desirable to form the incompletely threaded female portion by two pitches or more. Further, since the incompletely threaded female portion 22 does not contribute to the fastening operation after the fastening operation is completed, it is not meaningful to provide the incompletely threaded female portion beyond the necessity. Accordingly, it is desirable to form the incompletely threaded female portion by one to four pitches and more desirably by two to four pitches. In the embodiment, the incompletely threaded female portion 22 is formed by three pitches from the end of the nut body 20.

Further, the thread ridge shape of the incompletely threaded female portion 22 formed in the nut body 20 is not particularly limited, and any problem occurs even when the thread ridge is formed in a standard triangular thread ridge shape or a trapezoid thread ridge shape as long as the above-described dimensional relation is satisfied.

As described above, the nut of the present invention has an advantage that the seizing scarcely occurs even when the bolt is screwed into the nut at an angle larger than that of the related art, and hence the nut is very suitable for the automobile assembly line or the like.

EXPLANATIONS OF LETTERS OR NUMERALS 10 bolt
11 male-threaded portion
20 nut body
21 female-threaded portion
22 incompletely threaded female portion.

The invention claimed is:
1. An anti-seizing nut which has a bolt screwed into a nut body of the nut, the bolt having a male-threaded portion with a male-threaded external diameter d and a male-threaded core diameter d1,
  wherein at a bolt insertion side end of a smaller internal diameter female-threaded portion formed in the nut body, a larger internal diameter female-threaded portion having an internal diameter dimension D is formed by one pitch or more, and wherein the internal diameter dimension D is larger than (d +d1)/2 and is smaller than the male-threaded external diameter d.
2. The combination of an anti-seizing nut and a bolt according to claim 1,
  wherein the larger internal diameter female-threaded portion is formed by one to four pitches.
3. The combination of an anti-seizing nut and a bolt according to claim 1,
  wherein the larger internal diameter female-threaded portion has a core diameter and the smaller internal diameter female-threaded portion has a core diameter, and the core diameter of the larger internal diameter female-threaded portion is larger than the core diameter of the smaller internal diameter female-threaded portion.

* * * * *